(12) United States Patent
Crawford (10) Patent No.: US 12,349,803 B2
(45) Date of Patent: Jul. 8, 2025

(54) CLOSURE ASSEMBLY

(71) Applicant: UK PODS LIMITED, Middlesbrough (GB)

(72) Inventor: Palkesh D. Crawford, Middlesbrough (GB)

(73) Assignee: UK PODS LIMITED, Middlesbrough (GB)

( * ) Notice: Subject to any disclaimer, the term of this patent is extended or adjusted under 35 U.S.C. 154(b) by 307 days.

(21) Appl. No.: 18/028,577

(22) PCT Filed: Sep. 27, 2021

(86) PCT No.: PCT/GB2021/052510
§ 371 (c)(1),
(2) Date: Mar. 27, 2023

(87) PCT Pub. No.: WO2022/064227
PCT Pub. Date: Mar. 31, 2022

(65) Prior Publication Data
US 2023/0355005 A1 Nov. 9, 2023

(30) Foreign Application Priority Data
Sep. 28, 2020 (GB) ...................................... 2015339

(51) Int. Cl.
*A47C 27/08* (2006.01)
*A47C 3/16* (2006.01)
(Continued)

(52) U.S. Cl.
CPC .............. *A47C 27/086* (2013.01); *A47C 3/16* (2013.01); *F16K 15/148* (2013.01); *F16K 15/205* (2013.01)

(58) Field of Classification Search
CPC ........ A47C 3/16; A47C 27/086; B65D 55/14; B65D 45/02; F16K 15/148; F16K 15/205; A63H 3/02
See application file for complete search history.

(56) References Cited

U.S. PATENT DOCUMENTS 4,011,611 A * 3/1977 Lederman ............ A47C 15/006
5/655.4
5,848,946 A * 12/1998 Stillinger .......... A63B 21/00069
473/594
5,871,031 A * 2/1999 Greinacher ........... F16K 15/207
137/599.08
(Continued)

FOREIGN PATENT DOCUMENTS

WO 2015/051394 4/2015

OTHER PUBLICATIONS

Search Report for GB2015339.1 mailed Feb. 22, 2021.

*Primary Examiner* — Daphne M Barry
(74) *Attorney, Agent, or Firm* — Workman Nydegger (57) ABSTRACT

A closure assembly (100) comprising a connector assembly (102), mountable at an opening (402) providing a fluid path through the opening (402). The connector assembly (102) comprises a male connector member (108), comprising a first tubular body (107, 126) having a first proximal end (110, 128, 142) portion and a first distal end portion (112) along a first central axis (200), and a first flange (114) portion protruding radially outwards at said first proximal end (110, 128, 142) portion, and a female connector member (106), comprising a second tubular body (107, 126) having a second proximal end (110, 128, 142) portion and a second distal end portion (112) along a second central axis (200), a second flange (138) portion protruding radially outwards at said second proximal end (110, 128, 142) portion and at least one diametrically traversing internal support member at said distal end portion (112), said female connector member (106) being configured to coaxially matingly and interlock-
(Continued)

ingly engage with said male connector member (108), so as to securingly clamp at least a peripheral edge portion of the opening (402) of the flexible container (400) between said first and second flange (138) portion. The closure assembly (100) further comprises a plug member (104), said plug member (104) being configured to matingly and sealingly engage with said male connector member (108) and lockingly engage with said female connector during use.

18 Claims, 7 Drawing Sheets

(51) Int. Cl.
*F16K 15/14* (2006.01)
*F16K 15/20* (2006.01)

(56) References Cited

U.S. PATENT DOCUMENTS

| | | | |
|---|---|---|---|
| 6,929,021 B2* | 8/2005 | Cavenagh | B65D 81/052 |
| | | | 137/232 |
| 6,952,906 B2* | 10/2005 | Nelson | A47C 27/086 |
| | | | 53/436 |
| 7,434,594 B1* | 10/2008 | Robbins | B60P 7/065 |
| | | | 222/548 |
| 7,713,180 B2* | 5/2010 | Wickens | A63B 41/125 |
| | | | 482/907 |
| 10,591,085 B2* | 3/2020 | Lammers | F16K 15/148 |
| 2016/0223095 A1 | 8/2016 | Sando et al. | |
| 2017/0113151 A1* | 4/2017 | Smith | A63H 3/02 |
| 2023/0175602 A1* | 6/2023 | Goldsche | F16K 17/0413 |
| | | | 137/540 |
| 2024/0335044 A1* | 10/2024 | Webb | A47C 3/16 |

* cited by examiner

CLOSURE ASSEMBLY

CROSS-REFERENCE TO RELATED APPLICATIONS

The present application is a 35 U.S.C. § 371 U.S. National Stage of International Application No. PCT/GB2021/052510, filed on Sep. 27, 2021, which claims priority to Great Britain Patent Application No. 2015339.1, filed Sep. 28, 2020, the entire content of each of which is incorporated herein by reference.

TECHNICAL FIELD OF INVENTION

The present invention relates to a closure assembly for containers, and in particular, to a closure assembly for flexible containers, such as, for example, pellet-filled safety pods or bean-bags. Even more particularly, the present invention relates to a closure assembly having a lockable and tamper-proof plug.

INTRODUCTION

So called 'beanbags' as an article of furniture are generally known in the art of interior design and furnishing. The cover of a conventional beanbag may typically be made out of an expandable material, such as polyvinylchloride, leather or any other suitable fabric and the bag is typically filled with small pellets (e.g. 3-5 mm diameter) made from polymer material (e.g. polystyrene) suitable to "flow" easily within the flexible container and, thus, enabling the bag to conform to a user's body.

Figure 1:
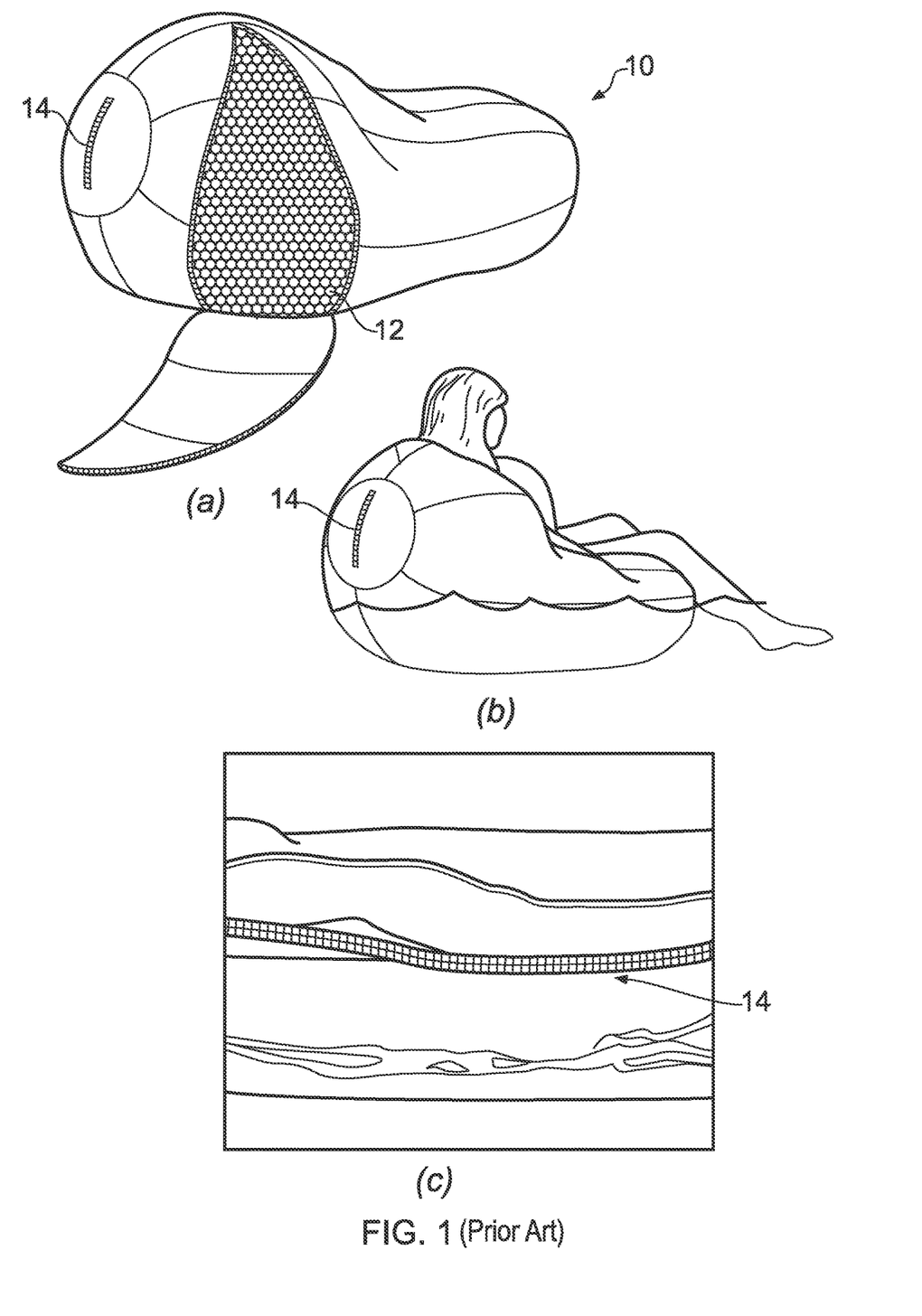
FIG. 1 (Prior Art) shows an illustration of (a) a common beanbag and (b) it's use as furniture, and (c) a close-up of a known zip and Velcro® closure.

FIG. 1 illustrates (a) an example of a typical beanbag 10 filed with polystyrene pellets 12 that are filled or refilled via a zip access 14 (see FIG. 1(c)). FIG. 1(b) shows a typical use of a common beanbag 10 as furnishing for a user.

In recent years such beanbags have been found very useful when applied as a safety pod, i.e. a beanbag that is a specially designed for use in industries that carry out physical interventions (e.g. restraint), such as, for example, in the police sector, the prison sector, the healthcare sector etc.

These safety pods have shown great potential when used within secure mental health facilities, where the need for the safety pod was due to an extremely high use of ground related restrain. Here, ground related restraint generally involves a large amount of risk from as low as minor bruising to as much as death of the restrained person. When the safety pods were ten introduced into health care services along with a new approach to this area of care, an unprecedented reduction of ground related restraint was witnessed with some areas achieving up to 100% reduction in ground restraint by using safety pods within practices.

It is understood that, due to the generally high impact use, these safety pods have to be purpose-build and specially constructed, as well as, medically reviewed. Thus, the safety pod is now widely considered as a piece of equipment that comes with associated training for handling and use.

For example, part of the essential requirements involves regular maintenance, such as, regular cleaning and the occasional top up of filler material (e.g. polymer pellets) may be required due to reduction of volume over time (use related). In particular, a safety pod may be filled with EPS (Expanded Poly Styrene) and each individual particle of EPS has the ability to reduce to a third of its original size from compression over time. Though, for a safety pod to be considered 'fit for purpose' in accordance with it manual of guidance, it needs to maintain a certain amount of volume to operate properly, so that, on average, a regularly used safety pod may need to be refilled at least once a year.

Typically, with currently available safety pods or common beanbags, when a top up or refill of filler is required, the safety pod is accessed, for example, via an exposed zip or a zip that is concealed under a Velcro strip (more secure).

However, typical zip or Velcro closures are usually not strong enough to withstand higher pressures (e.g. from high impact forces during use with a patient) and there is a risk of these closures to burst open. In addition, in extremely high-risk environments, there is a real risk that people/patients may gain entry into the pods by simply picking at the Velcro and/or unzipping the zip closure, potentially endangering themselves or other people. As a result, the currently known solution is to simply stitch up the whole safety pod or beanbag, thus, leaving the safety pod without an access point for refilling.

Therefore, it is an object of the present invention to provide an improved and tamper-proof closure assembly for flexible containers, such as, pellet-filled safety pods or beanbags.

SUMMARY OF THE INVENTION

According to a first embodiment of the invention there is provided a closure assembly for a flexible container, comprising:
  a connector assembly, mountable at an opening of the flexible container, configured to provide a fluid path through the opening of the flexible container, comprising:
    a male connector member, comprising a first tubular body having a first proximal end portion and a first distal end portion along a first central axis, and a first flange portion protruding radially outwards at said first proximal end portion, and
    a female connector member, comprising a second tubular body having a second proximal end portion and a second distal end portion along a second central axis, a second flange portion protruding radially outwards at said second proximal end portion and at least one diametrically traversing internal support member at said distal end portion, said female connector member being configured to coaxially matingly and interlockingly engage with said male connector member, so as to securingly clamp at least a peripheral edge portion of the opening of the flexible container between said first and second flange portion;
  a plug member, comprising a third cylindrical body having a third proximal end portion and a third distal end portion along a third central axis, at least two radially opposed locking members, each one protruding axially away from said distal end portion so as to lockingly engage with said internal support member during use, said plug member being configured to matingly and sealingly engage with said male connector member and lockingly engage with said female connector during use.

This provides the advantage of an easy access point coupleable to standard filling tubes, but which is securely lockable tamper-proof by only allowing access with a suitable tool that is adapted to operably engage with the plug member.

Advantageously, said locking members may comprise L-shaped locking members, each one protruding axially away from said distal end portion and circumferentially about said third central axis towards a first direction, so as to form a bayonet mount with said internal support member during use.

Advantageously, said female connector member may be configured to telescopically and rotatingly coaxially receive said male connector member and said male connector member is configured to telescopically and rotatingly coaxially receive said plug member.

Advantageously, said support member may comprise at last one internally threaded through bore extending parallel to said third centre axis and configured to threadingly engage with a screw fastener.

Preferably, said plug member may further comprise at least one counterbore axially recessed from said third proximal end portion towards said third distal end portion, configured to receive a screw fastener and abuttingly engage and axially align with said at least one internally threaded through bore. Even more preferably, said at least one counterbore may have a predetermined diameter and length adapted to prevent the insertion of a human digit.

This provides the advantage that a user or patient is unable to open the closure without a suitable tool, i.e. it is impossible to accidentally engage the securing/locking screw fasteners with a human digit (finger or toe), therefore, preventing accidental or intentional access and potential harm to the user.

Advantageously, said support member may comprise two of said at least one internally threaded through bore that are symmetrical to and equidistantly spaced apart from said third centre axis.

Advantageously, said plug member may comprise two of said at least one counterbore, each one arranged so as to axially align with a respective one of said two internally threaded through bores.

Advantageously, said support member may comprise a substantially planar grid structure arranged normal to said second central axis, configured to allow fluid flow through said connector assembly, during use.

Advantageously, said first tubular body of said male connector member may comprise an external thread portion and said second tubular body of said female connector member may comprise an internal thread portion adapted to threadingly engage with said external thread portion during use. Preferably, said external thread portion may be provided at said first proximal end portion adjacent to said first flange portion and said internal thread portion may be provided at said second proximal end portion adjacent to said second flange portion.

Advantageously, said second tubular body may be frustoconically shaped towards said second distal end portion.

Advantageously, said second tubular body may comprise a plurality of axially and circumferentially equidistantly arranged reinforcing external ribs.

Advantageously, said plug member may further comprise a third flange portion protruding radially outwards at said third proximal end portion. Preferably, each one of said first, second and third flange portion may have a frustoconical profile configured to matingly engage with a respective other one of said first, second and third flange portion.

Advantageously, said connector assembly may be adapted to operably receive a filling tube.

Advantageously, any one of said male connector member, said female connector member and said plug member may be made from a polymer or polymer compound using suitable polymer manufacturing processes (thermoforming, injection moulding, extrusion), but also 3D printing manufacturing processes.

According to another aspect of the present invention, there is provided a flexible container comprising a closure assembly according to the first embodiment of the present invention.

BRIEF DESCRIPTION OF THE DRAWINGS

Embodiment(s) of the invention will now be described, by way of example only, with reference to the accompanying drawings, in which.

DESCRIPTION

The described example embodiment relates to a closure assembly suitable for flexible containers, such as safety pods and beanbags. Although the invention is described with respect to flexible containers, it is not restricted to flexible containers altogether, but may also be used in other containers requiring tamper-proof and sealingly lockable access ports.

Certain terminology is used in the following description for convenience only and is not limiting. The words 'right', 'left', 'lower', 'upper', 'front', 'rear', 'upward', 'down' and 'downward', 'top' and 'bottom' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, relative positional terms, such as, 'distal', 'proximal', 'lateral' and 'medial' are understood in their normal meaning and in relation to a specific element being described. In particular, these terms designate directions in relation to the normal use of the closure assembly by the user, e.g. proximal is in a direction towards the user end of the closure assembly (during normal use), wherein distal refers to the direction away from the user end of the closure assembly.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner.

Figure 2:
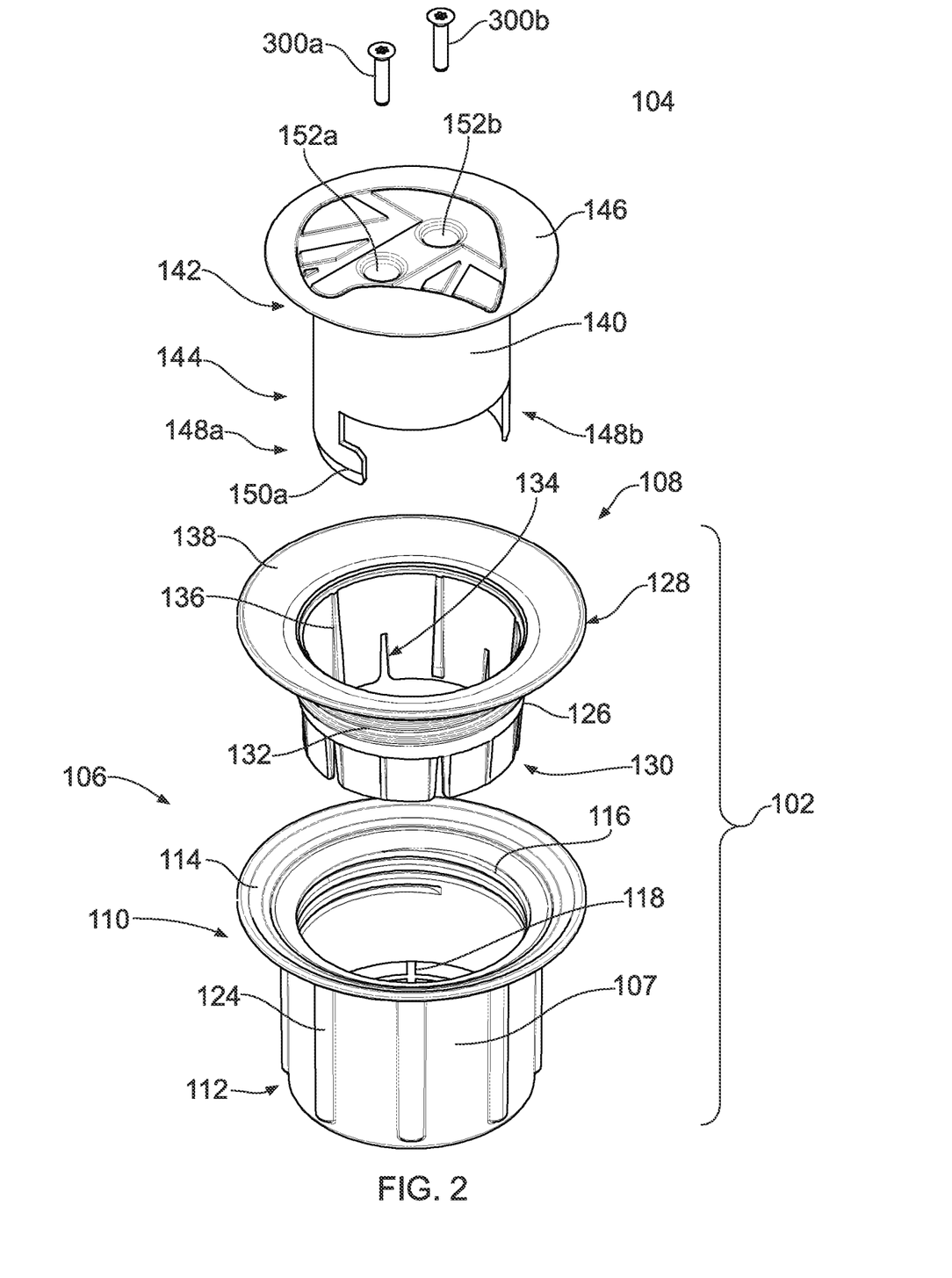
FIG. 2 is an illustration of an example embodiment of the closure example of the present invention in an exploded perspective view.
Figure 3:
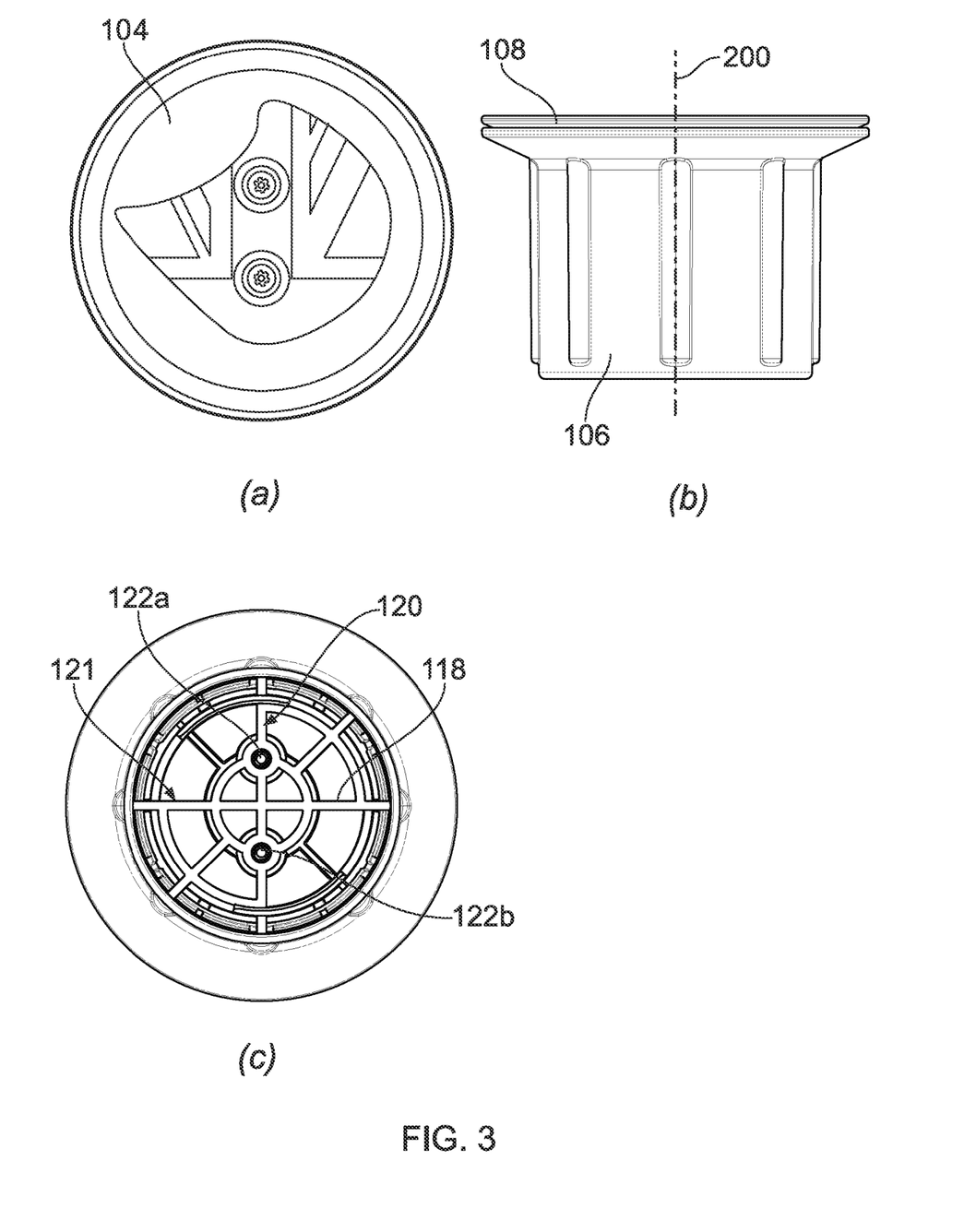
FIG. 3 is an illustration of the assembled closure assembly of FIG. 2(a) in a top view, (b) a front view and (c) a bottom view.
Figure 4:
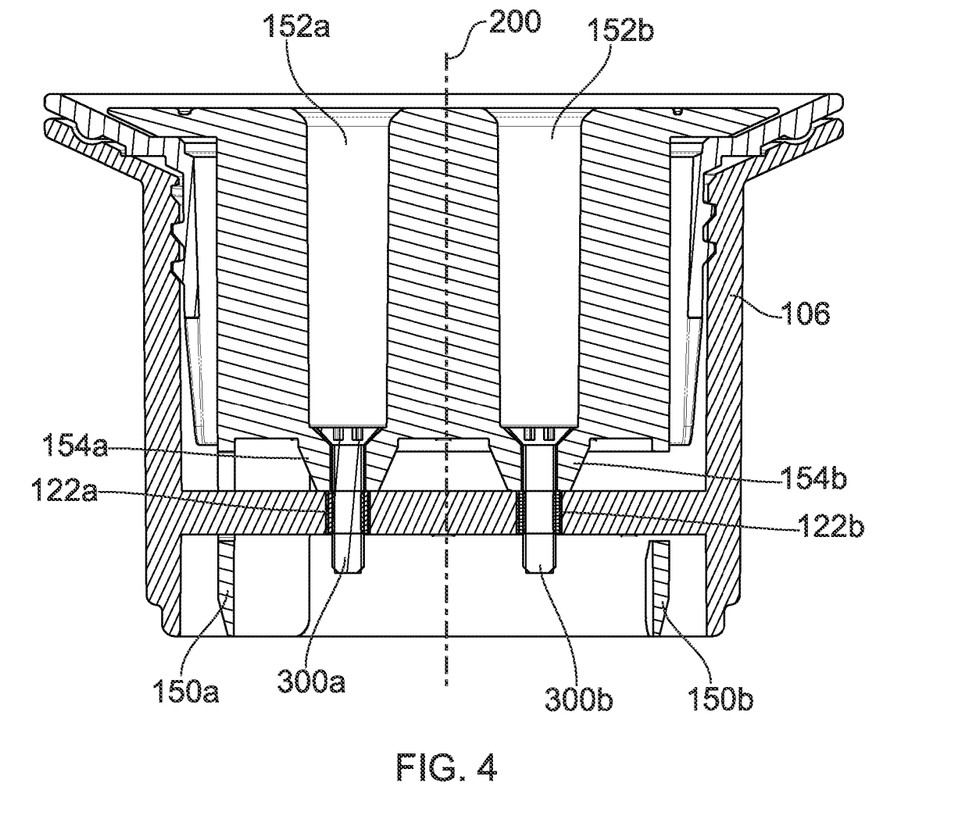
FIG. 4 is an illustration of a cross-sectional view of the assembled closure assembly of FIG. 3.
Figure 5:
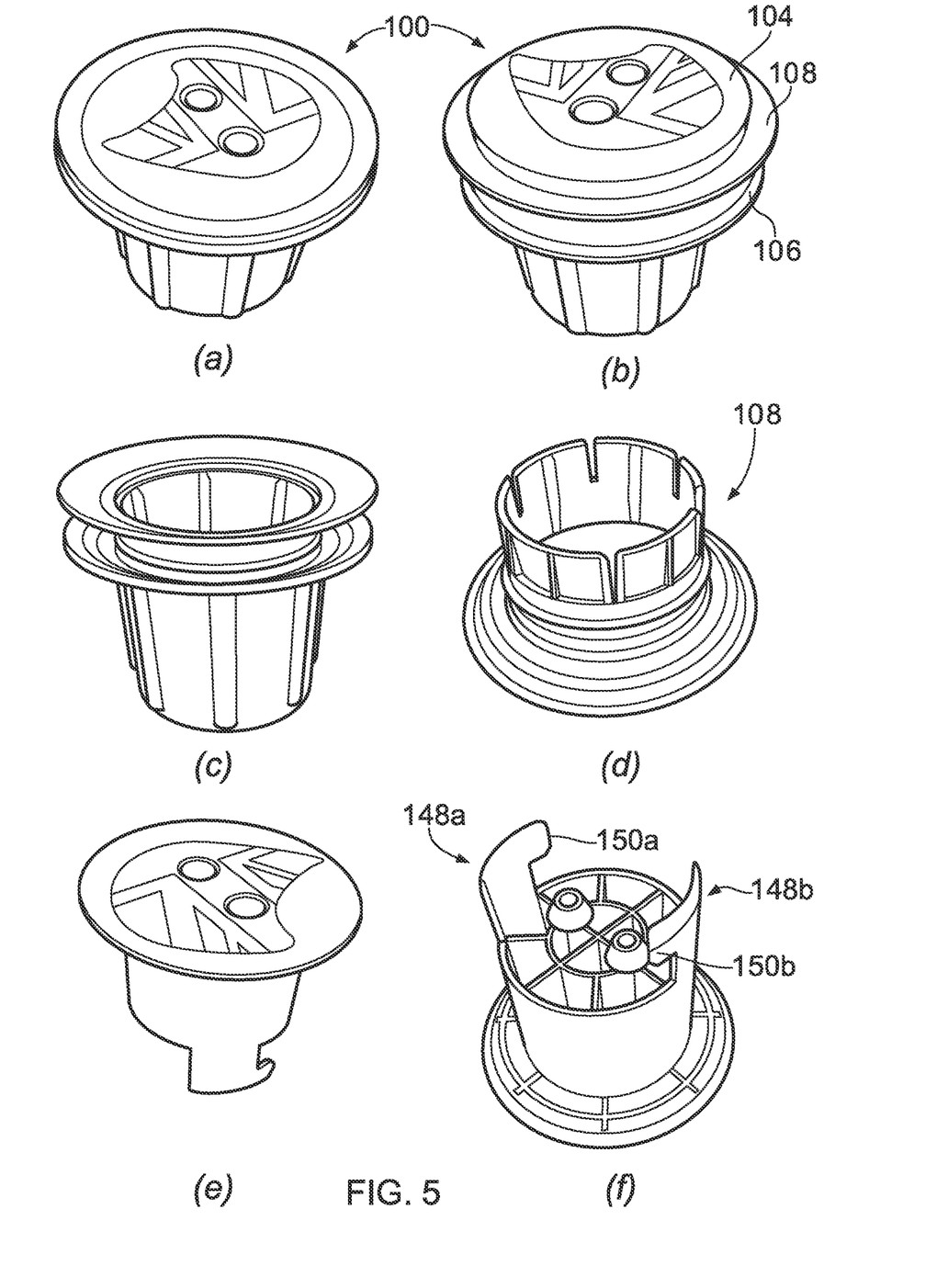
FIG. 5 shows perspective top and bottom views of an example embodiment of the closure assembly and its component parts (a) in its assembled state, top view, (b) slightly exploded assembled state, top view, (c) the assembled connector assembly, i.e. male connector member is partially received by the female connector member, top view, (d) the male connector member, bottom view, (e) the plug member, top view, and (f) the plug member, bottom view.

Referring now to FIGS. 2, 3 and 4, an example embodiment of the closure assembly 100 of the present invention comprises a connector assembly 102 and a plug 104. The connector assembly 102 includes a female connector member 106 and a male connector member 108 adapted to interlockingly engage with the female connector member 106.

The female connector member 106 has a substantially tubular body 107 extending along a central axis 200 (see FIG. 3) between a proximal end 110 and a distal end 112. A first flange 114 extends from the proximal end 110 in a direction radially away from an outer surface of the tubular body 107, so as to form a frustoconical profile tapered towards the proximal end 110 of the tubular body 107. An inner thread portion 116 is provided on the inner surface of the tubular body 107 extending from the proximal end 110 towards the distal end 112. A substantially planar support structure 118 is provided inside the tubular body 107 in a region closer to the distal end portion 112 extending through the tubular body 107 in a direction normal to the central axis 200. The support structure 118 comprises a mesh or grid structure configured to allow fluid flow through the female connector member 106 (i.e. the spacing of the grid structure is suitable to allow beanbag pellets to pass through). The grid structure has at least a first central crosspiece 120 and a second central crosspiece 121, orthogonal to the first central crosspiece 120. The first central crosspiece 120 further comprises two axially embedded screw nuts 122a, 122b, each one arranged equidistantly from the central axis 200. A plurality of ribs 124 are provided circumferentially equidistantly on an external surface of the tubular body 107.

The male connector member 108 also has a substantially tubular body 126, extending along a central axis 200 (the same central axis when fully assembled, see FIG. 3) between a proximal end 128 and a distal end 130, sized (or dimensioned), so as to matingly fit into the tubular body 107 of the female connector member 106. An external thread portion 132 is provided on an outer surface of the tubular body 126 extending from the proximal end 128 towards the distal end 130, and which is adapted to threadingly engage with the inner thread portion 116 of the female connector member 106 during assembly. The tubular body 126 of the male connector member 108 may be frustoconically tapered towards the distal end 130. Further, the distal end may be provided with a plurality of partial axial cuts 134 circumferentially equidistantly arranged so as to allow for flexure, e.g. when engaging with a filling tube (not shown). Also, the tubular body 126 may have a plurality of axial guide ribs 136 circumferentially equidistantly arranged on the inner surface (e.g. providing for a press fit with the filling tube). A second flange 138 extends from the proximal end 128 in a direction radially away from an outer surface of the tubular body 126, so as to form a frustoconical profile tapered towards the proximal end 128 of the tubular body 126 and dimensioned, so as to matingly engage with a top surface of the first frustoconically profiled flange 114 of the female connector member 106.

The plug 104 comprises a cylindrical body 140, extending along a central axis 200 (the same central axis 200 when fully assembled, see FIG. 3(b) and FIG. 4) between a proximal end 142 and a distal end 144, sized (or dimensioned) so as to matingly fit into the tubular body 126 of the male connector member 108. A third flange 146 extends from the proximal end 142 in a direction radially away from an outer surface of the cylindrical body 140 that is frustoconically tapered towards the distal end 144 of the cylindrical body 140 and dimensioned so as to matingly engage with a top surface of the second flange 138 of the male connector member 108. The plug 104 is further adapted to countersink into the frustoconical second flange 138 of the male connector member 108. Two radially opposing L-shaped locking members 148a, 148b extend axially away from the distal end 144 of the cylindrical body 140, wherein the end portion 150a, 150b of each one of the L-shaped locking members 148a, 148b bends circumferentially about the central axis 200 towards a first direction (e.g. anti-clockwise when viewed from the proximal end 142). The end portions 150a, 150b are spaced apart from the distal end 144 of the cylindrical body 140 by a predetermined distance, i.e. a distance suitable to allow the locking members 148a, 148b to lockingly engage with the support structure 118 (i.e. the end portions 150a, 150b are configured to slide underneath the support structure 118 during locking engagement, similar to a bayonet mount). Two diametrically arranged bores 152a, 152b extend through the cylindrical body 140 of the plug 104 in a direction parallel to the central axis 200 so as to provide two recessed counterbores 154a, 154b equidistantly spaced apart from the central axis 200 along a diameter of the cylindrical body 140 (see FIG. 4). The counterbores 154a, 154b are set "deep" into the cylindrical body 140, wherein the diameter and depth of the bores 152a, 152b are suitably configured to receive a screw fastener 300a, 300b and respective tool (not shown), but they are also dimensioned such as to prevent the insertion of a human digit (finger, toe) to reach and tamper with the inserted screw fastener 300a, 300b. The position of the bores 152a, 152b and recessed counterbores 154a, 154b is such that each one of the counterbores 154a, 154b coaxially aligns with a respective one of the two axially embedded screw nuts 122a, 122b of the female connector member 106, so as to allow a screw fastener 300a, 300b inserted into the counterbores 154a, 154b to threadingly engage with a respective one of the screw nuts 122a, 122b.

It is understood by the person skilled in the art that each one of the closure assembly components, plug 104, female connector member 106 and male connector member 108, may be made from a polymer material by suitable manufacturing processes, such as for example injection moulding, but also 3D printing or any other suitable method. Further, each one of the plug 104, female connector member 106 and male connector member 108 may be made from the same or a different material. The material used for each one of the components, plug 104, female connector member 106 and male connector member 108, may be a one-component material (1K) or a combination (e.g. 2K) of materials. When using a polymer base material for injection moulding, the polymer may be a compound material including other material components (e.g. metal, graphene, fibres, ceramic or the like).

FIGS. 5(a)-(f) shows different perspective views of the closure assembly 100 at different stages during assembly, e.g. (a) fully assembled (but without engagement with the flexible container), (b) plug 104, male connector member 108 and female connector member 106 slightly separated, (c) the connector assembly 102, (d) the male connector from the bottom, (e) the plug member 104, and (f) the plug member 104 from the bottom.

Figure 6:
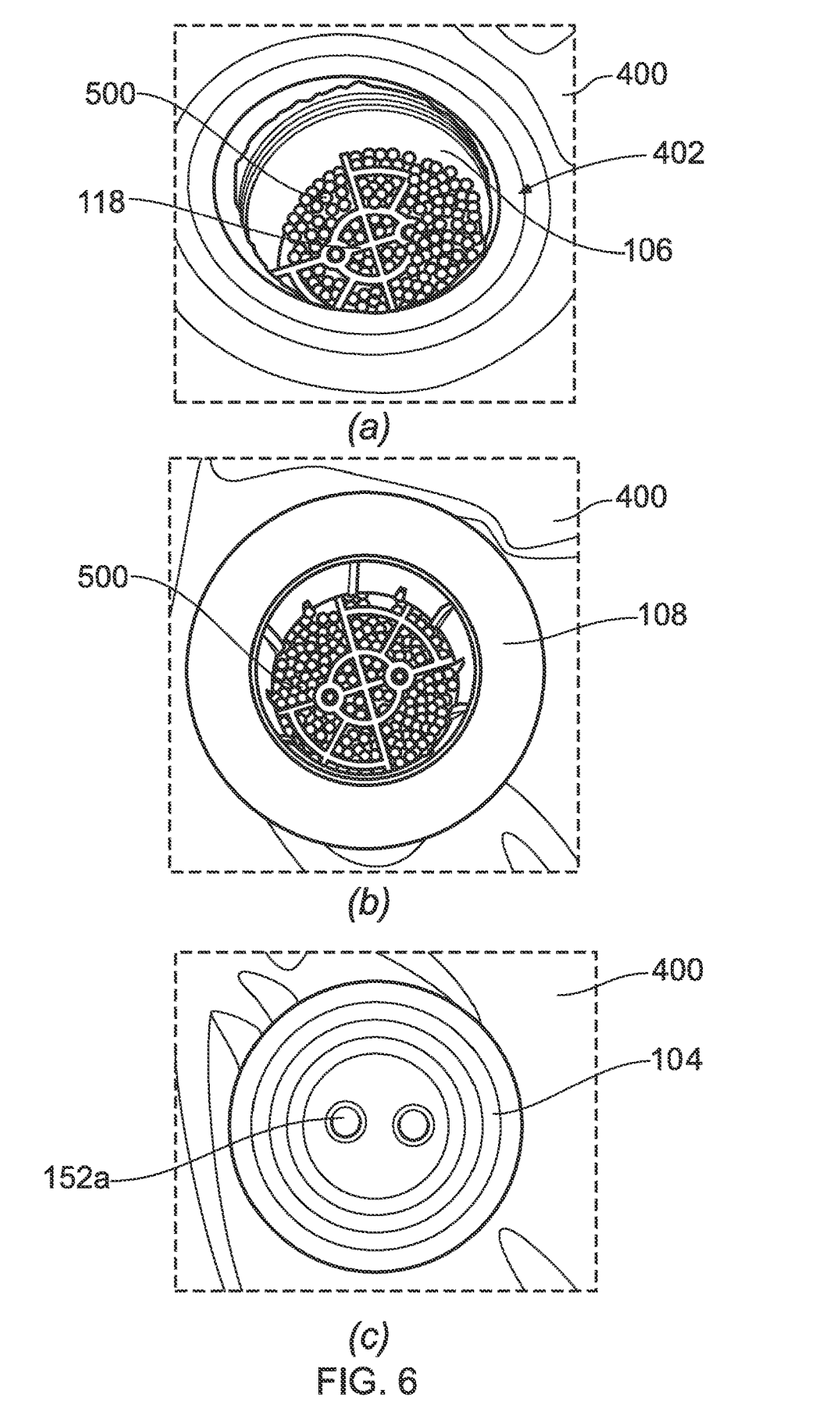
FIG. 6 shows perspective views of an example embodiment of the closure assembly during use (i.e. assembly) with (a) the female connector member engaged with the flexible container at the opening, (b) the male connector member operable interlocked within the female connector member and (c) the plug member lockingly and sealingly engaged with the male connector member and secured to the female connector member (via two screw fasteners)

Referring now to FIG. 6, in use, a flexible container 400 or safety pod is provided with a substantially circular opening 402 having a diameter that is suitable to receive the tubular body 126 of the male connector member 108, but prevent the first and second flanges 114, 138 from passing through. At this stage, the flexible container 400 or safety pod still has an external open stitch located on the base (i.e. a bottom panel of the pod) through which the female connector member 106 is moved inside the flexible container 400 or safety pod and located at the opening 402 by abuttingly engage the top surface of the first flange member 114 with a peripheral inside surface of the circular opening 402 of the flexible container 400. The tubular body 126 of the male connector member 108 is now moved into the tubular body 107 of the female member 106 and the inner and outer thread portions 116, 132 are screwed together until the peripheral edge portion of the circular opening 402 is clamped between the two engaging first and second flanges 114, 138. A silicone seal, glue or any other adhesive may be used to securely join or bond the peripheral edge portion of the opening 402 of the flexible container 400 with the clamping first and second flanges 114, 138.

At this stage, the connector assembly 102 is fully fitted to the flexible container 400 or safety pod and the external open stitch (located at the base) may be permanently closed. The flexible container 400 or safety pod is now ready for filling with suitable pellets 500 via a filling tube (not shown) that is operably connected to the male connector member 108 (e.g. press fit promoted by the axial cuts 134 and guide ribs 136). Once the container 400 is filled, the plug 104 is simply inserted into the male connector member 108 and axially rotated about its central axis 200 (e.g. one-quarter turn) until the end portions 150a, 150b of the L-shaped locking members 148a, 148b lockingly slide "under" the support structure 118 (e.g. first or second central crosspiece 120, 121) and the L-shaped locking members 148a, 148b abuttingly engage with one of the first and second crosspieces 120, 121, coaxially aligning the counterbores 154a, 154b with respective screw nuts 122a, 122b. Screw fasteners 300a, 300b can now be inserted into the bores 152a, 152b and through the counterbores 154a, 154b to screw into the screw nuts 122a, 122b and securely fasten the plug 104 to the female connector member 106.

Once secured, it will not be possible to accidentally open the closure assembly 100 by tampering with the plug 104 or any other component, because the user or patient will not be able to reach the screw fasteners 300a, 300b securely embedded into the bores 152a, 152b. A suitable tool (not shown) will be needed to access and loosen the screw fasteners 300a, 300b before the plug 104 can be rotated out of locking engagement with the connector assembly 102 to open the closure assembly 100.

Figure 7:
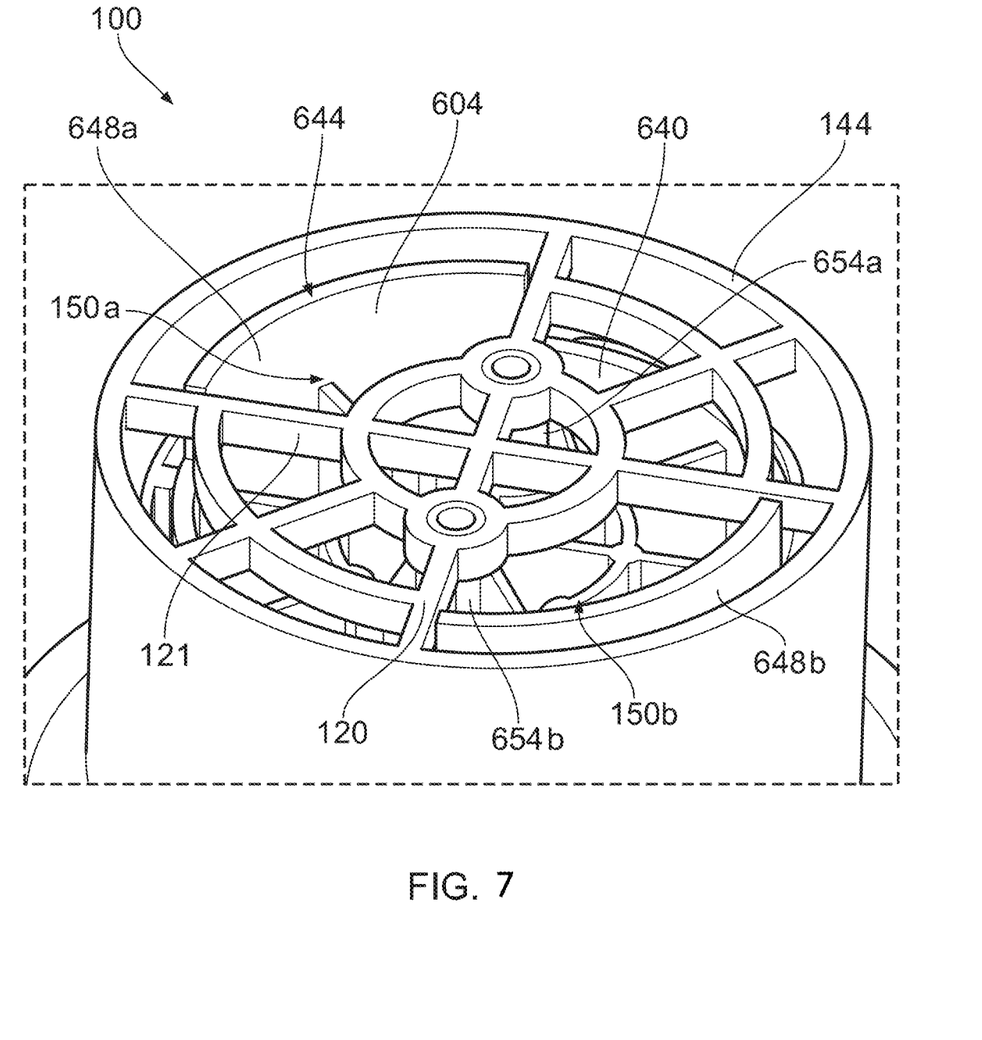
FIG. 7 shows a perspective partial bottom view of an embodiment of the closure assembly comprising an alternative plug member.

FIG. 7 shows a partial bottom view of the closure assembly 100 of the present invention comprising an alternative plug 604. The alternative plug 604 is formed similar to the plug 104, but without the two radially opposing L-shaped locking members 148a, 148b extending axially away from the from the distal end 144 of the cylindrical body 140 (see FIG. 2). Instead, the distal end 644 of plug 604 comprises two radially opposing locking members 648a, 648b, each one extending axially away from the cylindrical body 640, so as to fit into the opposing gaps 150a, 150b flush with the support structure 118 of the female connector member 106 (the distal end 644 of the plug 604 is aligned with the outer surface of the support structure 118), i.e. between the first and second crosspiece 120, 121, coaxially aligning the counterbores 654a, 654b with respective screw nuts 122a, 122b of the support structure 118.

The engaged locking members 648a,b also prevent the plug 604 from rotating with respect to the female connector member 106.

It will be appreciated by persons skilled in the art that the above embodiments have been described by way of example only and not in any limiting sense, and that various alterations and modifications are possible without departing from the scope of the invention as defined in the appended claims.

The invention claimed is:

1. A closure assembly for a flexible container, comprising:
 a connector assembly, mountable at an opening of the flexible container, configured to provide a fluid path through the opening of the flexible container, comprising:
  a male connector member, comprising a first tubular body having a first proximal end portion and a first distal end portion along a first central axis, and a first flange portion protruding radially outwards at said first proximal end portion, and
  a female connector member, comprising a second tubular body having a second proximal end portion and a second distal end portion along a second central axis, a second flange portion protruding radially outwards at said second proximal end portion and at least one diametrically traversing internal support member at said distal end portion, said female connector member being configured to coaxially matingly and interlockingly engage with said male connector member, so as to securingly clamp at least a peripheral edge portion of the opening of the flexible container between said first and second flange portion;
 a plug member, comprising a third cylindrical body having a third proximal end portion and a third distal end portion along a third central axis, at least two radially opposed locking members, each one protruding axially away from said third distal end portion so as to lockingly engage with said at least one internal support member during use, said plug member being configured to matingly and sealingly engage with said male connector member and lockingly engage with said female connector during use.

2. A closure assembly according to claim 1, wherein said at least two radially opposing locking members comprise L-shaped locking members, each one protruding axially away from said third distal end portion and circumferentially about said third central axis towards a first direction, so as to form a bayonet mount with said at least one internal support member during use.

3. A closure assembly according to claim 1, wherein said female connector member is configured to telescopically and rotatingly coaxially receive said male connector member and said male connector member is configured to telescopically and rotatingly coaxially receive said plug member.

4. A closure assembly according to claim 1, wherein said at least internal support member comprises at least one internally threaded through bore extending parallel to said third centre axis and configured to threadingly engage with a screw fastener.

5. A closure assembly according to claim 4, wherein said plug member further comprises at least one counterbore axially recessed from said third proximal end portion towards said third distal end portion, configured to receive a screw fastener and abuttingly engage and axially align with said at least one internally threaded through bore.

6. A closure assembly according to claim 5, wherein said at least one counterbore has a predetermined diameter and length adapted to prevent the insertion of a human digit.

7. A closure assembly according to claim 1, wherein said at least one internal support member comprises two of said at least one internally threaded through bore that are symmetrical to and equidistantly spaced apart from said third centre axis.

8. A closure assembly according to claim 7, wherein said plug member comprises two of said at least one counterbore, each one arranged so as to axially align with a respective one of said two internally threaded through bores.

9. A closure assembly according to claim 1, wherein said at least one internal support member comprises a substantially planar grid structure arranged normal to said second central axis, configured to allow fluid flow through said connector assembly, during use.

10. A closure assembly according to claim 1, wherein said first tubular body of said male connector member comprises an external thread portion and said second tubular body of said female connector member comprises an internal thread portion adapted to threadingly engage with said external thread portion during use.

11. A closure assembly according to claim 10, wherein said external thread portion is provided at said first proximal end portion adjacent to said first flange portion and said internal thread portion is provided at said second proximal end portion adjacent to said second flange portion.

12. A closure assembly according to claim 1, wherein said second tubular body is frustoconically shaped towards said second distal end portion.

13. A closure assembly according to claim 1, wherein said second tubular body comprises a plurality of axially and circumferentially equidistantly arranged reinforcing external ribs.

14. A closure assembly according to claim 1, wherein said plug member further comprises a third flange portion protruding radially outwards at said third proximal end portion.

15. A closure assembly according to claim 14, wherein each one of said first, second and third flange portion has a frustoconical profile configured to matingly engage with a respective one of said first, second and third flange portion.

16. A closure assembly according to claim 1, wherein said connector assembly is adapted to operably receive a filling tube.

17. A closure assembly according to claim 1, wherein any one of said male connector member, said female connector member and said plug member is made from a polymer or polymer compound using suitable polymer manufacturing processes (thermoforming, injection moulding, extrusion), but also 3D printing manufacturing processes.

18. A flexible container comprising a closure assembly according to claim 1.

* * * * *